United States Patent [19]
Zuppiger

[11] 3,744,430
[45] July 10, 1973

[54] PLATFORM CONVEYORS

[75] Inventor: Paul Zuppiger, Geneva, Switzerland

[73] Assignees: Battelle Memorial Institute, Carouge/Geneve; Dunlop Holdings Limited, London, England

[22] Filed: May 17, 1971

[21] Appl. No.: 143,989

[30] Foreign Application Priority Data
May 22, 1970   Great Britain................... 24,857/70

[52] U.S. Cl.................. 104/25, 198/110, 198/229, 198/16 MS
[51] Int. Cl. ........................................... B65g 21/16
[58] Field of Search.......................... 104/25, 30, 31; 198/16 R, 16 MS, 181, 110, 229

[56] References Cited
UNITED STATES PATENTS

| | | | |
|---|---|---|---|
| 1,956,154 | 4/1934 | Lindquist et al. ................. | 198/16 R |
| 3,319,758 | 5/1967 | Goubie............................. | 198/16 R |
| 3,364,872 | 1/1968 | Bouladon et al..................... | 104/25 |

Primary Examiner—Gerald M. Forlenza
Assistant Examiner—D. W. Keen
Attorney—Stevens, Davis, Miller & Mosher

[57] ABSTRACT

A platform conveyor comprising a variable speed portion in which the platforms move relative to one another wherein each platform has grooves provided in the load-bearing surface for combing at the ends of the conveyor. The sides of the grooves are sloping so that the lateral movement adjacent platforms vertically displaces obstructing matter from the grooves.

5 Claims, 6 Drawing Figures

PATENTED JUL 10 1973 3,744,430

PLATFORM CONVEYORS

This invention relates to conveyor tread-forms, particularly for conveyors comprising a plurality of platforms in which the platforms also move laterally relative to each other such as occurs when the platforms are moved in a curved path to obtain a speed variation.

Conveyor tread-forms are normally formed with grooves of rectangular section, the grooves extending in the direction of motion of the conveyor and a series of projections at the end of the load carrying section of the conveyor fit into each groove to remove obstructing material. This action is known as combing. In conveyors of the platform type moving in a curved path the lateral movement of the adjacent platforms results in the ends of the grooves across each platform moving at an angle to the direction of the grooves and this movement causes any obstruction in the grooves either to be sheared off, to jam the system, or damage the platform.

According to one aspect of the invention a platform conveyor comprises a low-speed portion, a high-speed portion and an intermediate variable speed portion comprising a plurality of platforms which, in the variable speed portion, move laterally relative to one another wherein each platform has provided a load-bearing surface having grooves to allow combing at the end of a load-bearing portion of the conveyor by a comb member, each groove having sloping side faces such that the interaction of grooves due to the lateral movement between adjacent platforms causes obstructing matter in the groove to be vertically displaced.

Another aspect of the invention provides grooves in two directions across the platform load bearing surfaces. In this case the conveyor may be combed at both the low and high speed ends.

Further aspects of the invention will be understood from the following description of some particular embodiments, by way of example only, in conjunction with the accompanying diagrammatic drawings in which.

Figure 1:
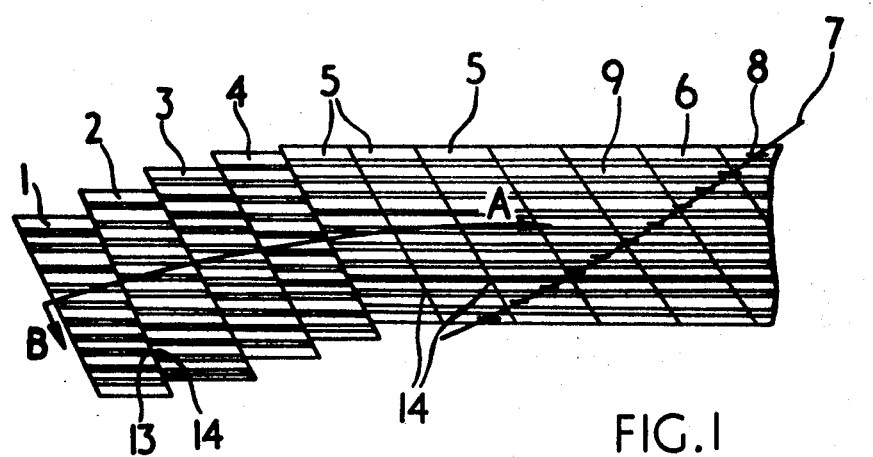
FIG. 1 is a plan view of a conveyor with high-speed combing.

In FIG. 1 a conveyor comprises a series of interlinked platforms 1 to 6 of parallelogram outline which are driven in the direction A from below. The platforms 5 move in a straight line and form the high-speed region of the conveyor. The platforms 1 to 4 are also moved in the direction B relative to each other, and this movement together with movement along the curved path A causes acceleration of each platform up to the high-speed region of the conveyor. The speed ratio between platform 1 and platform 5 is determined by the curvature of the path A and the angle of the direction B to that of the high-speed conveyor.

In operation the platform is loaded at platform 1 and unloaded at platform 6 onto a further constant high-speed conveyor (not illustrated) running parallel to the high-speed region of the conveyor. The platforms are returned from position 6 to position 1 by passing them back under the usable conveyor region.

Each platform section is provided with a series of equally spaced grooves 9 across its load bearing surface in the direction of the movement of the conveyor at the unloading region 6. The grooves 9 of each platform 5 and 6 are in alignment so that a bar 7 carrying combing points 8 may sweep along the grooves of each platform section in turn. Each groove 9 has side walls 10 and 11 at an included angle of 45° (See FIG. 3).

Figure 3:
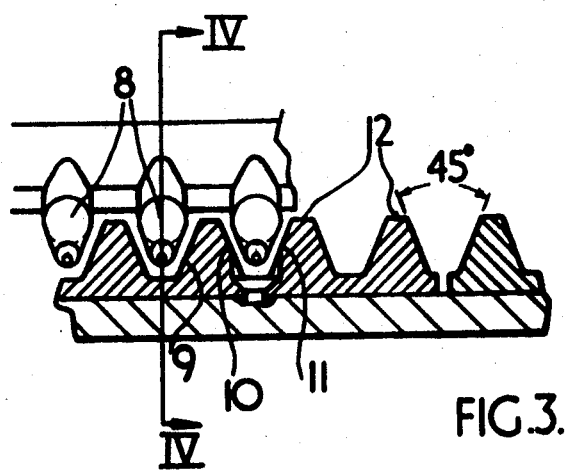
FIG. 3 is a cross-section of part of the platform tread immediately in front of the combs.
Figure 4:
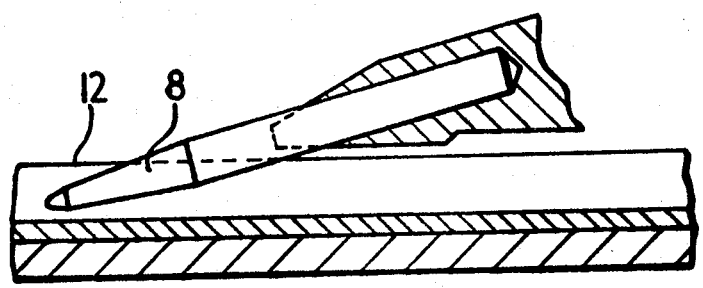
FIG. 4 is a sectional side view of a comb projection on the line IV–IV of FIG. 3.

The combing points 8 (as shown in FIG. 3 and FIG. 4) comprise teeth mounted on and equally spaced along a supporting beam 7 such that each groove in the platform tread surface is swept by a corresponding tooth.

The points 8 of the comb may have an effective cross-section similar to the groove cross-section. In this arrangement the sides of the point make an included angle of 45° and the point is slightly smaller than the groove to allow a running clearance; for example, for a groove depth of 9 mm., a clearance of 2.5 mm. could be allowed between the base of the groove and the underside of the point, with a clearance of 1 mm. at the sides.

In the acceleration region of the conveyor the platforms also move in the direction B and consequently the ends of the adjacent grooves 13 and 14 are moved relative to each other. As each of the groove faces is at an angle any obstruction lying in the grooves tends to be lifted out by such lateral movement by wedging action of the side faces.

The top surface of the platform 12 comprises a series of parallel ridges and forms the load-bearing surface of the conveyor.

Figure 2:
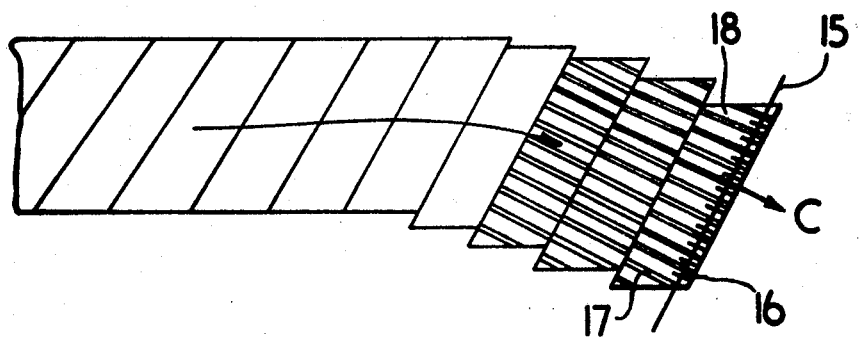
FIG. 2 is a plan view of a conveyor with low-speed combing.

In FIG. 2 the conveyor is shown with the combing action at the low-speed end of the conveyor such as is used for a deceleration or off-loading conveyor. The combing action is then at the region of the lowest speed and is carried out by a combing beam 15. The direction of the combing points 16 and grooves 17 must be perpendicular, when viewed in plan, to the movement of the platform 18 (i.e., direction C) and once again relative movement between platforms in a lateral direction causes the ends of adjacent grooves to move across each other during deceleration and this is allowed for by using grooves of the above described form to prevent obstruction of this lateral movement.

Figure 5:
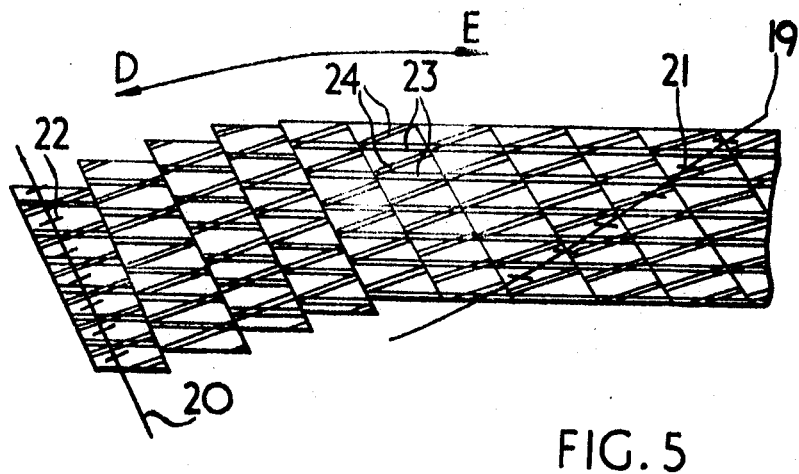
FIG. 5 is a plan view of a conveyor with reversing provision.
Figure 6:
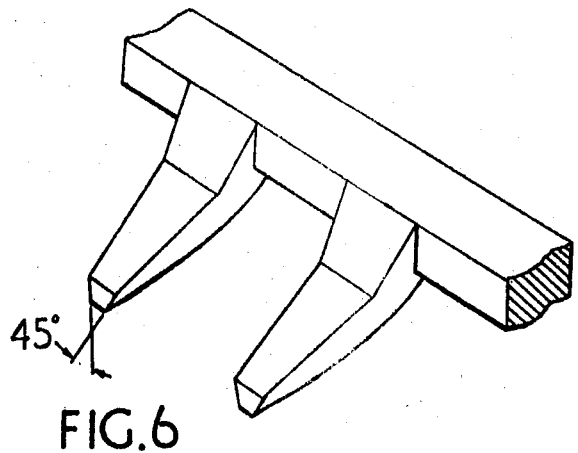
FIG. 6 is a perspective view of an alternative comb.

FIG. 5 shows an embodiment of a platform conveyor suitable for movement in either direction D or E to allow use of the load-bearing portion of the conveyor for acceleration or deceleration by simply reversing the direction of movement of the conveyor. Use in the acceleration direction E is as in FIG. 1 and requires a combing action at the beam 19 whereas use in the deceleration direction D is as in FIG. 2 and requires combing action at the beam 20. To allow for both combing actions each platform tread surface is formed with two sets 23, 24 of parallel grooves. One set 23 is in the direction of the combing projections 21 and the other set 24 in the direction of the combing projections 22. All the grooves have their opposing faces at an included angle of 45° in order to vertically displace obstructing matter during the lateral movement of the platforms.

It will be understood that included angles other than 45° may conveniently be used. The choice of angle depends on the force of vertical lift required and the surface loading on the ridge areas 12.

Having now described my invention what I claim is:

1. A platform conveyor comprising a low-speed portion, a high-speed portion and an intermediate variable-speed portion, and a plurality of platforms which, in the variable-speed portion, move laterally relative to one another wherein each platform includes a load-bearing surface having grooves to allow combing at the end of a load-bearing portion of the conveyor by a comb member, each groove having sloping side faces such that the interaction of grooves due to the lateral movement between adjacent platforms causes obstructing matter in a groove to be vertically displaced.

2. A platform conveyor as in claim 1 wherein the grooves are in a direction substantially parallel to the direction of movement of the platforms at the high-speed end of the conveyor.

3. A platform conveyor as in claim 1 wherein the grooves are in a direction substantially parallel to the direction of movement of the platforms at the low-speed end of the conveyor.

4. A platform conveyor as in claim 1 wherein the grooves extend in two directions, one direction parallel to the direction of movement of the platforms at the high-speed end of the conveyor and one direction parallel to the direction of movement of the platforms at the low-speed end of the conveyor.

5. A platform conveyor according to claim 1 wherein the sloping side faces of each groove are at an included angle of 45°.

* * * * *